United States Patent
Mullender et al.

(10) Patent No.: US 11,240,060 B1
(45) Date of Patent: Feb. 1, 2022

(54) APPARATUS, SYSTEM, AND METHOD FOR PROVIDING SIMULTANEOUS DELIVERY OF OUTPUT COMMUNICATIONS

(71) Applicant: Groupon, Inc., Chicago, IL (US)

(72) Inventors: Matthijs Mullender, Sammamish, WA (US); Andrew Ma, Redmond, WA (US); Arpan Sinha, Seattle, WA (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 16/854,434

(22) Filed: Apr. 21, 2020

Related U.S. Application Data

(63) Continuation of application No. 15/190,078, filed on Jun. 22, 2016, now Pat. No. 10,666,454.

(60) Provisional application No. 62/183,966, filed on Jun. 24, 2015.

(51) Int. Cl.
*H04L 12/28* (2006.01)
*H04W 4/80* (2018.01)
*H04W 88/04* (2009.01)
*H04B 1/3827* (2015.01)

(52) U.S. Cl.
CPC ......... *H04L 12/2858* (2013.01); *H04B 1/385* (2013.01); *H04W 4/80* (2018.02); *H04W 88/04* (2013.01)

(58) Field of Classification Search
CPC ........ H04W 88/04; H04W 4/80; H04B 1/385; H04L 12/2858
See application file for complete search history.

(56) References Cited

U.S. PATENT DOCUMENTS

| | | | |
|---|---|---|---|
| 9,179,256 B1* | 11/2015 | Pietraniec | H04W 4/023 |
| 2004/0194110 A1 | 9/2004 | Mckee et al. | |
| 2011/0026704 A1 | 2/2011 | Connelly et al. | |
| 2013/0305322 A1 | 11/2013 | Raleigh et al. | |
| 2014/0010515 A1* | 1/2014 | Lee | H04L 65/605 |
| | | | 386/207 |
| 2014/0115072 A1* | 4/2014 | Welcher | H04L 51/18 |
| | | | 709/206 |
| 2014/0364089 A1* | 12/2014 | Lienhart | H04W 4/12 |
| | | | 455/412.2 |
| 2015/0009096 A1 | 1/2015 | Lee et al. | |
| 2015/0052571 A1* | 2/2015 | Stokking | H04N 21/23418 |
| | | | 725/116 |

(Continued)

*Primary Examiner* — Rupal Dharia
*Assistant Examiner* — Adam A Cooney
(74) *Attorney, Agent, or Firm* — Alston & Bird LLP

(57) ABSTRACT

An apparatus, system, and method are provided herein to provide simultaneous delivery of output communications to a client device and a secondary client device are discussed herein. Some embodiments may include an apparatus including processing circuitry configured to: receive one or more electronic communications; configure the one or more electronic communications for presentation to the client device and the secondary client device based on the delivery identifier; and provide the one or more electronic communications to the client device via a wide area network to facilitate simultaneous delivery of the one or more output communications corresponding to the one or more electronic communications on the client device and the secondary client device. The one or more output communications may be provided to the secondary client device via the client device and a personal area network that is separate from the wide area network.

14 Claims, 6 Drawing Sheets

(56) References Cited

U.S. PATENT DOCUMENTS

| | | |
|---|---|---|
| 2015/0106770 A1 | 4/2015 | Shah et al. |
| 2015/0180816 A1 | 6/2015 | Varoglu et al. |
| 2015/0341903 A1* | 11/2015 | Jeong ............... H04W 68/02 455/458 |
| 2016/0174025 A1* | 6/2016 | Chaudhri ............ H04B 1/385 455/41.1 |
| 2016/0360031 A1* | 12/2016 | Rauenbuehler ......... H04L 67/26 |

* cited by examiner

APPARATUS, SYSTEM, AND METHOD FOR PROVIDING SIMULTANEOUS DELIVERY OF OUTPUT COMMUNICATIONS

CROSS-REFERENCE TO RELATED APPLICATIONS

This application claims the benefit of U.S. Provisional Patent Application No. 62/183,996, titled "Apparatus, System, And Method For Providing Simultaneous Delivery Of Output Communications," filed Jun. 24, 2015, which is incorporated by reference herein in its entirety.

FIELD

Example embodiments of the present invention relate generally to electronic communication management and, more particularly, to an apparatus, system, and method, for providing simultaneous delivery of output communications.

BACKGROUND

Applicant has discovered problems with existing systems and methods for electronic communication management. Through applied effort, ingenuity, and innovation, Applicant has solved many of these identified problems by developing a solution that is embodied by the present invention and described in detail below.

BRIEF SUMMARY

Techniques for providing simultaneous delivery of output communications to two or more client devices associated with one or more networks are discussed herein. For example, some embodiments may include an apparatus configured to provide simultaneous delivery of output communications to a client device connected with the apparatus via a wide area network and a secondary client device connected with the client device via a personal area network separate from the wide area network. The apparatus may include: a processor including one or more processing devices configured to perform independently or in tandem to execute hard-coded functions or execute software instructions; and a non-transitory memory comprising one or more volatile or non-volatile electronic storage devices storing computer-readable instructions, the computer-readable instructions being configured, when executed, to cause the processor to: receive one or more electronic communications; configure the one or more electronic communications for presentation to the client device and the secondary client device based on the delivery identifier; and provide the one or more electronic communications to the client device via the wide area network to facilitate simultaneous delivery of the one or more output communications corresponding to the one or more electronic communications on the client device and the secondary client device, wherein the one or more output communications are provided to the secondary client device via the client device and the personal area network.

In some embodiments, the memory may store computer-readable instructions that, when executed, cause the processor to: receive a delivery indication corresponding to the one or more electronic communications configured for provision to the client device and the secondary client device.

In some embodiments, the memory may store computer-readable instructions that, when executed, cause the processor to: receive an indication of the secondary client device associated with the client device; and determine a predetermined period to deliver the one or more output communications in response to receiving the indication of the secondary client device associated with the client device.

In some embodiments, the client device may be configured to: provide a delivery indication corresponding to the one or more electronic communications; and determine a delivery time corresponding to the one or more electronic communications.

In some embodiments, the client device may be further configured to deliver the one or more output communications simultaneously to the client device and the secondary client device based at least in part on the delivery identifier.

In some embodiments, configuring the one or more output communications for simultaneous delivery by the client device and the secondary client device based on the delivery identifier may include: determine mechanism identifiers associated with the client device and the secondary device; determining the delivery identifier based on the mechanism identifiers; and correlating the delivery identifier to each of the one or more electronic communications.

In some embodiments, the one or more electronic communications may be provided to the client device and the secondary client device in response to the expiration of a pre-determined period.

In some embodiments, the wide area network may include the Internet and the personal area network includes a wireless network separate from the Internet.

In some embodiments, the one or more output communications may include at least one of a notification, alert, reminder, invite, video, audio, or streaming content.

Some embodiments may include a system configured to provide simultaneous delivery of output communications to a client device connected with the system via a wide area network and a secondary client device connected with the client device via a personal area network separate from the wide area network. The system may include: one or more servers including processing circuitry configured to: receive one or more electronic communications; configure the one or more electronic communications for presentation to the client device and the secondary client device based on a delivery identifier; and provide the one or more electronic communications to the client device via the wide area network to facilitate simultaneous delivery of the one or more output communications corresponding to the one or more electronic communications on the client device and the secondary client device, wherein the one or more output communications are provided to the secondary client device via the client device and the personal area network.

In some embodiments, the system may further include the client device configured to: receive, via the wide area network, the one or more electronic communications; provide, via the personal area network, the one or more electronic communications to the secondary client device; provide, via the wide area network, a delivery indication corresponding to the one or more electronic communications; and determine the delivery identifier corresponding to the one or more electronic communications.

In some embodiments, the client device may be further configured to deliver the one or more output communications simultaneously to the client device and the secondary client device based at least in part on the delivery identifier.

In some embodiments, the wide area network may include the Internet and the personal area network includes a wireless network separate from the Internet.

In some embodiments, the secondary client device may be configured to associate, via the personal area network, with the client device. The processing circuitry may be further configured to: receive an indication of the secondary client device associated with the client device; and determine a predetermined period to deliver the one or more output communications in response to receiving the indication of the secondary client device associated with the client device.

Some embodiments may include a machine implemented method for providing simultaneous delivery of output communications to a client device connected with an apparatus via a wide area network and a secondary client device connected with the client device via a personal area network separate from the wide area network. The method may include: receiving, by processing circuitry of the apparatus, one or more electronic communications; configuring, by the processing circuitry, the one or more electronic communications for presentation to the client device and the secondary client device based on a delivery identifier; and providing, by the processing circuitry and via the wide area network, the one or more electronic communications to facilitate simultaneous delivery of the one or more output communications corresponding to the one or more electronic communications on the client device and the secondary client device, wherein the one or more output communications are provided to the secondary client device via the client device and the personal area network.

In some embodiments, the method may further include receiving, by the processing circuitry, a delivery indication corresponding to the one or more electronic communications configured for provision to the client device and the secondary client device In some embodiments, the method may further include, by the processing circuitry: receiving an indication of the secondary client device associated with the client device; and determining a predetermined period to deliver the one or more output communications in response to receiving the indication of the secondary client device associated with the client device.

In some embodiments, the method may further include, by the client device: providing a delivery indication corresponding to the one or more electronic communications; and determining a delivery time corresponding to the one or more electronic communications.

In some embodiments, the method may further include, by the client device, delivering the one or more output communications simultaneously to the client device and the secondary client device based at least in part on the delivery identifier.

In some embodiments, configuring the one or more output communications for simultaneous delivery by the client device and the secondary client device based on the delivery identifier may include: determining mechanism identifiers associated with the client device and the secondary device; determining the delivery identifier based on the mechanism identifiers; an correlating the delivery identifier to each of the one or more electronic communications.

In some embodiments, the one or more electronic communications may be provided to the client device and the secondary client device in response to the expiration of a pre-determined period.

In some embodiments, the wide area network may include the Internet and the personal area network may include a wireless network separate from the Internet.

In some embodiments, the one or more output communications may include at least one of a notification, alert, reminder, invite, video, audio, or streaming content.

Additional features and advantages of the present invention will be set forth in portion in the description which follows, and in portion will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

The above summary is provided merely for purposes of summarizing some example embodiments to provide a basic understanding of some aspects of the invention. Accordingly, it will be appreciated that the above-described embodiments are merely examples and should not be construed to narrow the scope of the invention in any way. It will be appreciated that the scope of the invention encompasses many potential embodiments in addition to those here summarized, some of which will be further described below.

BRIEF DESCRIPTION OF THE DRAWINGS

Having therefore described certain example embodiments of the present disclosure in general terms, reference will now be made to the accompanying drawings, which are not necessarily drawn to scale, and wherein.

DETAILED DESCRIPTION

Overview

Figure 1:
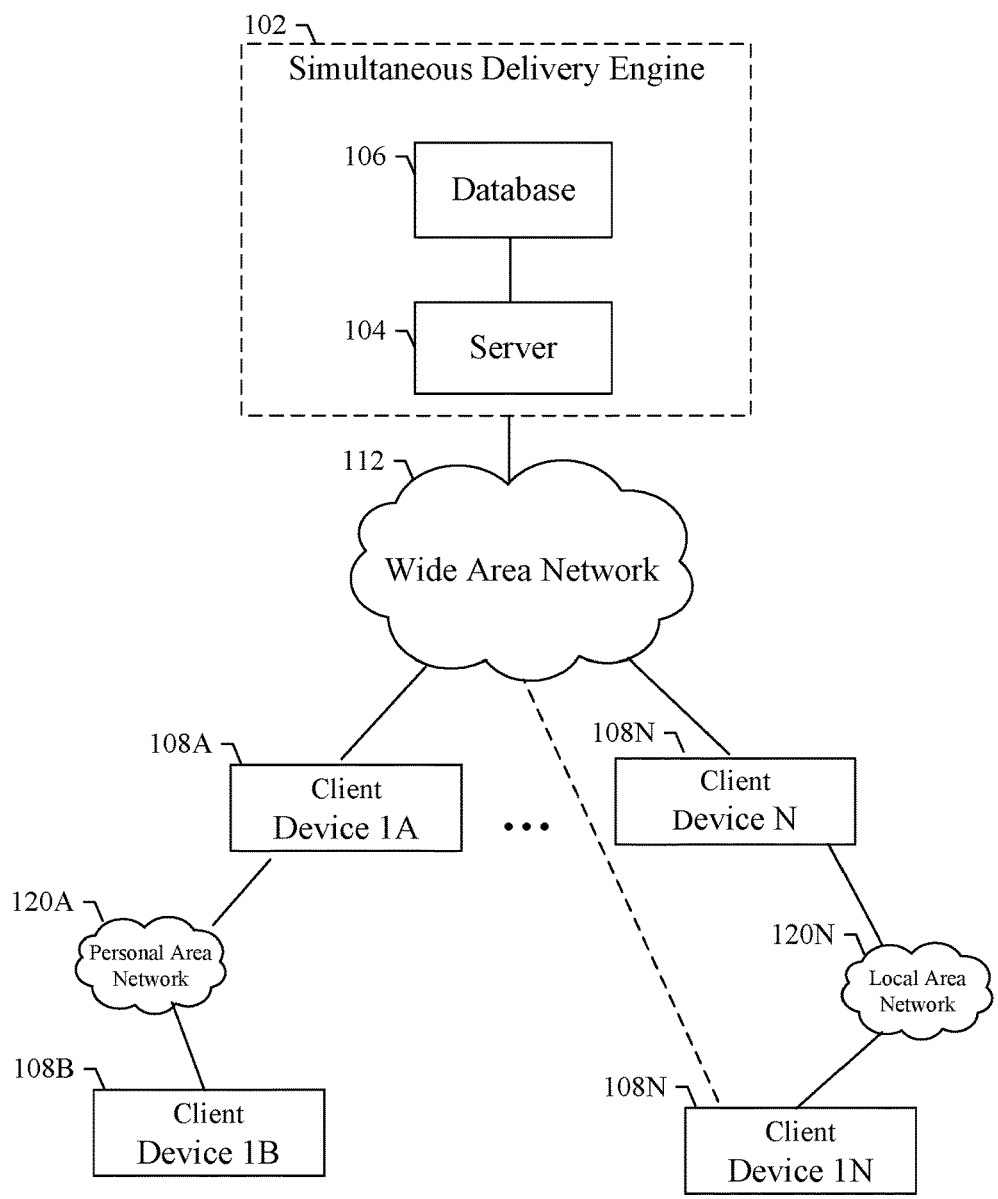
FIG. 1 illustrates a block diagram of an example system according to some example embodiments.

Various embodiments of the present invention are directed to improved apparatuses, systems, and methods for providing simultaneous (e.g., synchronous, concurrent, or near concurrent) delivery (e.g., output) of output communications (e.g., electronic or otherwise digital notifications such as email notifications, short message service messages, voice messages, alerts, video, audio, streaming content, etc.) to two or more client devices (e.g., a personal computer and a smartphone) associated with one or more networks. The one or more networks may comprise at least one of an area network (e.g., a wide area network, local area network, or personal area network), virtual private network, mobile network, or communication network. As described herein, the simultaneous delivery engine may receive one or more electronic communications for provision to two or more client devices.

In turn, the simultaneous delivery engine may configure the one or more electronic communications for presentation to the two or more client devices based on a delivery identifier (e.g., a timestamp included within the metadata of an electronic communication). The delivery identifier may include a delivery time at which the electronic communications may be provided to the two or more client devices. Alternatively, or additionally, the delivery identifier may include a delivery time at which the output communications may be output by the two or more client devices.

Upon configuring the one or more electronic communications for presentation to the two or more client devices based on a delivery identifier, the simultaneous delivery engine may provide the one or more electronic communications to the two or more client devices for simultaneous delivery, via one or more networks, in the form for output communications. To that end, the two or more client devices may be configured to deliver, via a client delivery engine, the one or more output communications simultaneously based at least in part on the delivery identifier.

The invention as described embodies the development of an unconventional framework that solves technological problems such as the inability to simultaneously deliver efficient and scalable output communications via multiple client devices and one or more networks. As will be appreciated, the apparatus has solved such technological problems as delivering output communications via corresponding client devices simultaneously with or by the use of one or more networks in a manner that is efficient and scalable to meet the demands of serving multiple client devices.

The client delivery engine may further provide technical solutions for the delivery of output communications via a client device (e.g., a tablet or smart phone) associated with, for example, a local area network (e.g., a Wi-Fi network) and a personal area network (e.g., a Bluetooth®, Z-Wave, Zig-Bee, Wireless USB, or other wireless network configured to communicate among personal devices). The client device may be configured, in some embodiments, to pass, via the client delivery engine, the electronic communications to a secondary client device (e.g., a smart watch, smart eyewear, or other wearable) that is paired with the client device or otherwise associated with the personal area network. In some embodiments, the client device may receive an indication of the secondary client device (e.g., the smart watch) associated with the client device (e.g., the tablet) of the two or more client devices. In turn, the client delivery engine may be configured to determine a predetermined period (e.g., a latent period) to deliver the one or more output communications based on the delivery identifier in response to receiving the indication of the secondary client device associated with the client device.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "simultaneous delivery engine" may include hardware components (e.g., hardware circuitry) and, in some embodiments, software components for configuring the hardware that may be accessible via one or more computing devices and that is operable to configure electronic communications for delivery in the form of output communications (described herein below) via two or more client devices. In some embodiments, the simultaneous delivery engine may provide the electronic communications to two or more client devices for subsequent delivery of the output communications via the client delivery engine.

As used herein, the term "client delivery engine" may include hardware components (e.g., hardware circuitry) and, in some embodiments, software components for configuring the hardware that may correspond to one or more client devices and that may be operable to receive electronic communications. Such components may further be operable to simultaneously deliver, via the two or more client devices, output communications corresponding to the electronic communications. In some embodiments, the client delivery engine may provide the electronic communications to one or more secondary client devices via one or more networks. In turn, the client device and the one or more secondary client devices may simultaneously deliver, via one or more client delivery engines associated with the one or more secondary client devices, output communications corresponding to the electronic communications as described herein.

As used herein, the term "network" refers to a set of hardware components (e.g., hardware circuitry) and computing devices connected by communication channels such that the connection of the hardware components and the computing devices are configured to exchange data among various devices (e.g., servers, client devices, transmission media, databases, routers/switches, etc.). In some embodiments, a network may take the form of an area network, virtual private network (e.g., VPN), or other communications network configured to exchange data among devices. An area network may comprise a wide area network (e.g., the Internet, cellular network, etc.) which is configured to cover an extensive area (e.g., an area including metropolitan, regional, national, or international boundaries) via a plurality of leased telecommunication lines. An area network may also comprise a local area network (e.g., a Wi-Fi configured network) configured to connect computing devices within a predetermined area (e.g., a limited area) such as a within a business, home, school, or other area. In some embodiments, an area network may comprise a personal area network configured to connect (e.g., pair) personal client devices (e.g., smartphones, wearables, personal digital assistants, computers, and other electronic devices) among such devices or to a local or wide area network. The client devices associated with a personal area network may be configured to support Bluetooth®, Z-Wave, ZigBee, Wireless USB, or other wireless network protocols and technologies.

As used herein, the term "electronic communication" refers to any digital or electronically generated information content or data received by the simultaneous deliver engine and, in turn, provided to a client device. Electronic communications may include electronically generated data corresponding to an output communication as described herein. It should be appreciated that the term "electronic communication" implies and requires some portion of the content of the communication to be generated via an electronic process.

In some embodiments, electronic communications may be configured to correspond to output communications. The term "output communication" may be used to refer to electronic or otherwise digital notifications. Output communications may be derived from electronic communications which may be rendered, generated, transformed, or otherwise made to take the form of output via a client device as described herein. An output communication may take the form of, for example, an email, short message service (SMS) message, notification, application interface, voice message, alert, reminder, invite, video, audio, streaming content, or the like. For example, an output communication may be a text message corresponding to electronically generated message data (e.g., an electronic communication) received via the simultaneous delivery engine and subsequently provided to a client device for the purpose of notifying a user associated with the client device of an awaiting message.

The term "delivery identifier" as used herein should be understood to refer to characters or data identifying the occurrence of an event. A delivery identifier may refer to a date, time of day, or period of time that an event is to occur in real-time or near real-time. In some embodiments, the electronic communications may be configured for simultaneous delivery in the form of output communications by the two or more client devices based on a delivery identifier. For example, a delivery identifier (e.g., a timestamp) may be embedded in the electronic communications data of the received one or more electronic communications. In some embodiments, the delivery identifier may be embedded in the metadata of the electronic communication.

As used herein, the term "location data" refers to electronic information indicating a particular location corresponding to the client device. Location data may be associated with a user or any entity capable of interaction with the simultaneous deliver engine. For example, in some embodiments location data is provided by a location services module of a user mobile device. It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel that communicates with the apparatus. In this regard, communication channel data may include a type of device (e.g., smart phone, desktop computer, laptop, wearable, netbook, tablet computer, etc.), the Internet Protocol (IP) address of the device, the available bandwidth of a connection, or any other data pertaining to the communication channel between the simultaneous deliver engine and an entity external to the simultaneous deliver engine.

As used herein, the term "discretionary data" refers to electronic information provided by a user explicitly to the simultaneous deliver engine in support of improved interaction with the simultaneous deliver engine. It should be appreciated that the term "discretionary data" is intended to refer to information voluntarily and explicitly provided to the simultaneous deliver engine. However, it should be appreciated that the examples of discretionary data provided above may also be determined implicitly or through review or analysis of other electronic data provided to the simultaneous deliver engine. It should also be appreciated that the simultaneous delivery engine may also gain access to certain features or tools based on whether certain discretionary data has been provided.

Technical Underpinnings and Implementation of Exemplary Embodiments

The advent of client devices configured for electronic communication has revolutionized the modes by which users communicate and/or receive communications. In the past, users would typically have to communicate via word of mouth or physical media (e.g., physical mail transported via a postal delivery service, physical newspapers, or physical message boards). However, the digital age has provided a wealth of new modes that may be used to optimize the user's ability to communicate electronically. As a result, new technologies have been developed to facilitate communication to client devices and among such client devices.

Unlike conventional communication techniques related to the use of paper or other physical media, various apparatuses offer a wealth of additional electronic solutions to improve the experience for client device users. The ability to receive communications electronically using a client device provides users with the ability to remain connected to business, personal, or social frameworks. Through the use of various technologies and protocols, an output communication may be delivered (e.g., output, rendered, or displayed) by multiple client devices immediately without delay. For example, multiple client devices may receive and without delay display an electronic communication in the form of an output communication (e.g., an email notification) that contains information of interest to a user of those client devices. Hence, the user no longer has to access a web browser based email client to receive notifications of an email.

However, these apparatuses are not without problems. Although the ability to receive communications electronically provides a convenient way to receive information, the inventors have determined that existing techniques may not always leverage this mode of communication in an efficient or accurate manner. Technology continues to rapidly advance in the field of analytics and the processing of this information, offering improved communications and analysis techniques, resulting in rapid communications and real-time (or near real-time) connectivity.

The inventors have identified various problems and difficulties that occur in providing simultaneous delivery (e.g., output) of output communications via two or more client devices such as the inability to output efficient, scalable output communications via multiple client devices via one or more networks. The inventors have solved such technological obstacles achieved by developing an unconventional framework that delivers said electronic communications in the form of output communications via corresponding client devices simultaneously. As will be appreciated, the inventors have determined an unconventional framework accomplished in a manner that is efficient and scalable to meet the demands of serving multiple client devices in communication via one or more networks.

For example, previous efforts at delivering output communications resulted in inconsistencies in delivery of output communications among multiple client devices. For example, one client device may deliver an output communication before another client device delivers an identical output communication. In a particular example, a smart watch associated with a wide area network (e.g., a cellular network) may deliver an output communication in the form of a vibration to indicate a message has arrived, but the email client on a laptop associated with a local area network (e.g., a Wi-Fi capable network) does not yet display the output communication. To that end, such inconsistencies consequently interfere with the receipt of output communications which thereby limits the user's experience. Therefore, the ability to provide simultaneous delivery (e.g., output) of output communications via two or more client devices associated with one or more networks is forfeited, or reduced, due to the inflexibility of systems which are not configured to deliver output communications simultaneously.

The inventors have therefore determined that existing electronic systems fail to address these issues. As a result of these problems and others that may arise from time to time, limitations and inefficiencies may be introduced into the process of providing delivery (e.g., output) of output communications. Therefore, the inventors have solved for such identified shortcomings taking into account the need for a framework that provides simultaneous delivery of output communications to two or more client devices associated with one or more networks.

System Architecture and Example Apparatus

Apparatuses, systems, and methods of the present invention may be embodied by any of a variety of devices. For example, the apparatuses, systems, and methods of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, wearable, or any combination of the aforementioned devices.

In this regard, FIG. 1 discloses an example computing system within which embodiments of the present invention may operate. Client devices may access a simultaneous delivery engine 102 via a network 112 (e.g., an area network such as the Internet or Bluetooth® supported network, mobile network, or other communications network) using client devices 108A through 108N. Moreover, the simultaneous delivery engine 102 may comprise a server 104 in communication with a database 106.

The server 104 may be embodied as a computer or computers as known in the art. The server 104 may provide for receiving of electronic data from various sources, including but not necessarily limited to the client devices 108A-N. For example, the server 104 may be operable to receive and process electronic communications (e.g., electronically generated data corresponding to email messages, notifications, voice messages, alerts, reminders, invites, video, audio, streaming content, or the like) provided by the client devices 108 and/or provided to the client devices 108.

The database 106 may be embodied as a data storage device such as a Network Attached Storage (NAS) device or devices, or as a separate database server or servers. The database 106 includes information accessed and stored by the server 104 to facilitate the operations of the simultaneous delivery engine 102. For example, the database 106 may include, without limitation, communication channel data (e.g., an IP address), analytic results, reports, and/or the like.

The client devices 108A-N may be any computing device as known in the art and may be operated by a user. Electronic data received by the server 104 from the client devices 108A-N may be provided in various forms and via various methods. For example, the client devices 108A-N may include desktop computers, laptop computers, smartphones, netbooks, tablet computers, wearables, and the like. The information may be provided through various sources on these client devices.

In embodiments where a client device 108 is a mobile device, such as a smart phone or tablet, the client device 108 may execute an "app" (e.g., an app configured to include a client delivery engine as described herein with reference to FIG. 3) to interact with the simultaneous delivery engine 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of users. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The simultaneous delivery engine 102 may leverage the application framework offered by the mobile operating system to allow users to designate which information is provided to the app and which may then be provided to the simultaneous delivery engine 102. For example, the user may indicate that they wish to provide location information to the app from location services circuitry included in their mobile device. Providing this information to the simultaneous delivery engine 102 may enable the simultaneous delivery engine 102 to provide electronic communications to the client device 108 corresponding to the user based on the particular location of the user (e.g., by providing delivery of electronic communications, to each client device proximate to the current location of the user's client device 108).

Various other types of information may also be provided in conjunction with an app executing on the user's mobile device. For example, if the mobile device includes a social networking feature, the user may enable the app to provide updates to the user's social network to notify friends of a particularly interesting electronic communications delivered in the form of output communications (e.g., a newsfeed alert). It should be appreciated that the use of mobile technology and associated app frameworks may provide for particularly unique and beneficial uses of the simultaneous delivery engine through leveraging the functionality offered by the various mobile operating systems.

Additionally or alternatively, the client device 108 may interact with the simultaneous delivery engine 102 via a web browser.

An example of a data flow for exchanging electronic information among one or more client devices and the simultaneous delivery engine is described below with respect to FIG. 5.

Example Apparatuses for Implementing Embodiments of the Present Invention

Figure 2A:
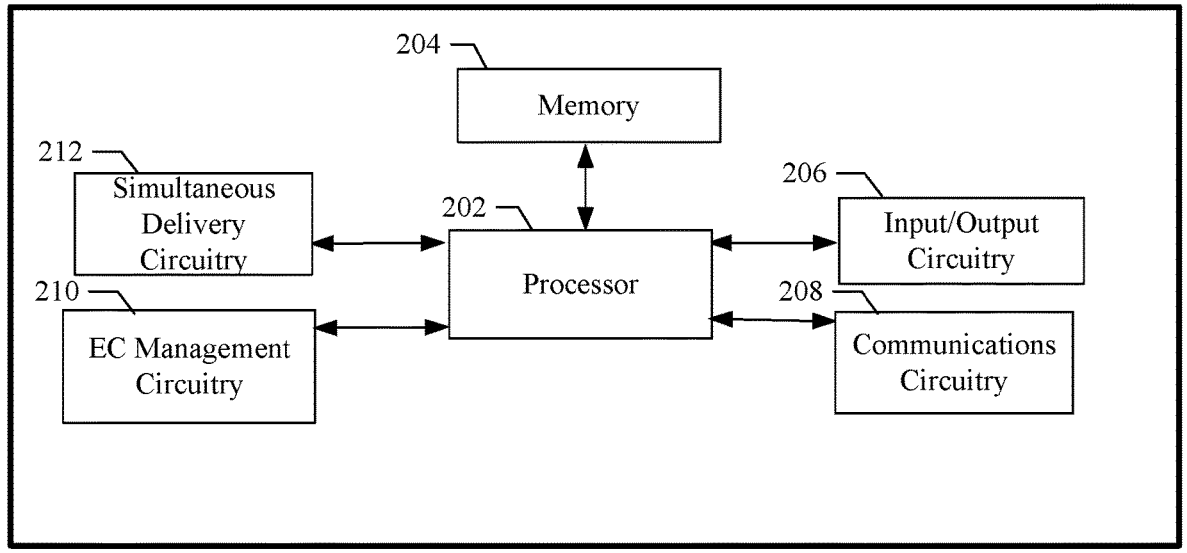
FIG. 2a illustrates a block diagram showing an example server for implementing provision of electronic communications using special-purpose circuitry in accordance with some example embodiments of the present invention.

The server 104 may be embodied by one or more computing systems, such as apparatus 200A shown in FIG. 2*a*. As illustrated in FIG. 2*a*, the apparatus 200A may include a processor 202, a memory 204, input/output circuitry 206, communications circuitry 208, EC (electronic communication) management circuitry 210, simultaneous and delivery circuitry 212. The apparatus 200A may be configured to execute the operations described above with respect to FIG. 1 and below with respect to FIGS. 3-6. Although these components 202-212 are described with respect to functional limitations, it should be understood that the particular implementations necessarily include the use of particular hardware. It should also be understood that certain of these components 202-212 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200A may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or coprocessor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200A may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200A. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The EC management circuitry 210 includes hardware configured to receive one or more electronic communications via, for example, one or more networks 112. For example, EC management circuitry 210 may receive one or more electronic communications via an area network (e.g., a local area network, wide area network, personal area network, etc.). The one or more electronic communications may be stored in the memory 204 or database 106 by the EC management circuitry 210. The EC management circuitry 210 may utilize processing circuitry, such as the processor 202, to perform the actions described herein. However, it should also be appreciated that, in some embodiments, the EC management circuitry 210 may include a separate processor, specially configured field programmable gate array (FPGA), or application specific interface circuit (ASIC). The EC management circuitry 210 is therefore implemented using hardware components of the apparatus configured by either hardware or software for implementing these planned functions.

The simultaneous delivery circuitry 212 includes hardware configured to receive one or more electronic communications. For example, simultaneous delivery circuitry 212 may receive one or more electronic communications provided, via EC management circuitry 210. The one or more electronic communications may be stored in the memory 204 or database 106 by the simultaneous delivery circuitry 212. The simultaneous delivery circuitry 212 may utilize processing circuitry, such as the processor 202, to perform the actions described herein. However, it should also be appreciated that, in some embodiments, the simultaneous delivery circuitry 212 may include a separate processor, specially configured field programmable gate array (FPGA), or application specific interface circuit (ASIC). The simultaneous delivery circuitry 212 is therefore implemented using hardware components of the apparatus configured by either hardware or software for implementing these planned functions.

In further embodiments, the simultaneous delivery circuitry 212 may be operable to configure the one or more electronic communications for simultaneous delivery by the two or more client devices based at least in part on a delivery identifier (e.g., a timestamp embedded in the metadata of an electronic communication). For example, simultaneous delivery circuitry 212 may configure the one or more electronic communications for simultaneous delivery based on one or more timing mechanisms (e.g., one or more clocks) associated with the apparatus 200A and each of the two or more client devices. The simultaneous delivery circuitry 212 may determine a mechanism identifier (e.g., a clock time) associated with each of the timing mechanisms corresponding to each of the two or more client devices. The mechanism identifiers may be stored in the memory 204 or database 106 by the simultaneous delivery circuitry 212 as described herein with reference to FIG. 3.

Alternatively or additionally, the simultaneous delivery circuitry 212 may be configured to provide the one or more electronic communications for simultaneous delivery of the one or more output communications corresponding to the one or more electronic communications associated with one or more networks. For example, simultaneous delivery circuitry 212 may provide one or more electronic communications, via the processing circuitry 202 or one or more networks (e.g., the network 112 as described herein with reference to FIG. 1), to the two or more client devices. The one or more electronic communications provided by simultaneous delivery circuitry 212, via the processing circuitry 202 or one or more networks 112, may be stored in memory, such as the memory 204, as described herein with reference to FIG. 3.

It is noted that all or some of the information presented by the example displays discussed herein can be based on data that is received, generated and/or maintained by one or more components of apparatus 200A. In some embodiments, one or more external systems (such as a remote cloud computing and/or data storage system) may also be leveraged to provide at least some of the functionality discussed herein.

Figure 2B:
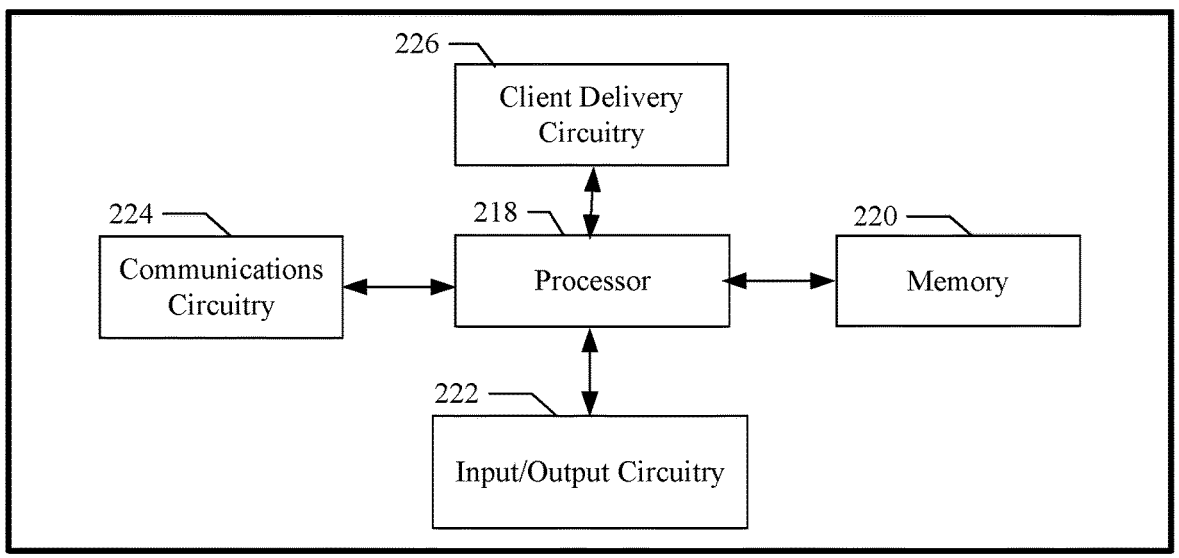
FIG. 2b illustrates a block diagram showing an example client device for implementing simultaneous delivery of output communications using special-purpose circuitry in accordance with some example embodiments of the present invention.

The client devices 108 may be embodied by one or more computing systems, such as apparatus 200B shown in FIG. 2b. As illustrated in FIG. 2b, the apparatus 200B may include a processor 218, a memory 220, an input/output circuitry 222, communications circuitry 224, and client delivery circuitry 226.

The client delivery circuitry 226 includes hardware configured to receive one or more electronic communications. For example, client delivery circuitry 226 may receive one or more electronic communications provided, via simultaneous delivery circuitry 212. The one or more electronic communications may be stored in the memory 220 or database 106 by the client delivery circuitry 226. The client delivery circuitry 226 may utilize processing circuitry, such as the processor 218, to perform the actions described herein. However, it should also be appreciated that, in some embodiments, the client delivery circuitry 226 may include a separate processor, specially configured field programmable gate array (FPGA), or application specific interface circuit (ASIC). The client delivery circuitry 226 is therefore implemented using hardware components of the apparatus (e.g., the apparatuses 200B) configured by either hardware or software for implementing these planned functions.

In further embodiments, the client delivery circuitry 226 may be configured to determine the delivery identifier corresponding to the one or more electronic communications, via the processing circuitry 218. For example, each of the two or more client devices may determine, via the metadata associated with the one or more electronic communications, the delivery time at which the one or more electronic communications may be output (e.g., rendered) in the form of output communications. In some example embodiments, when the apparatus 200A may not configure the delivery identifier to include a delivery time, the apparatuses 200B (e.g., two or more client devices) may include hardware configured to determine a delivery time corresponding to one or more electronic communications. At least one of the two or more client devices may determine, via the client delivery circuitry 226 and the processing circuitry 218, a mechanism identifier (e.g., a clock time) associated with the timing mechanisms (e.g., a clock) corresponding to each of the two or more client devices. In turn, the client delivery circuitry 226 may determine one or more offsets (e.g., a value representative of a delay in time) relative to the respective mechanism identifiers to normalize the time as between each respective timing mechanism as described herein with reference to FIG. 3.

Figure 3:
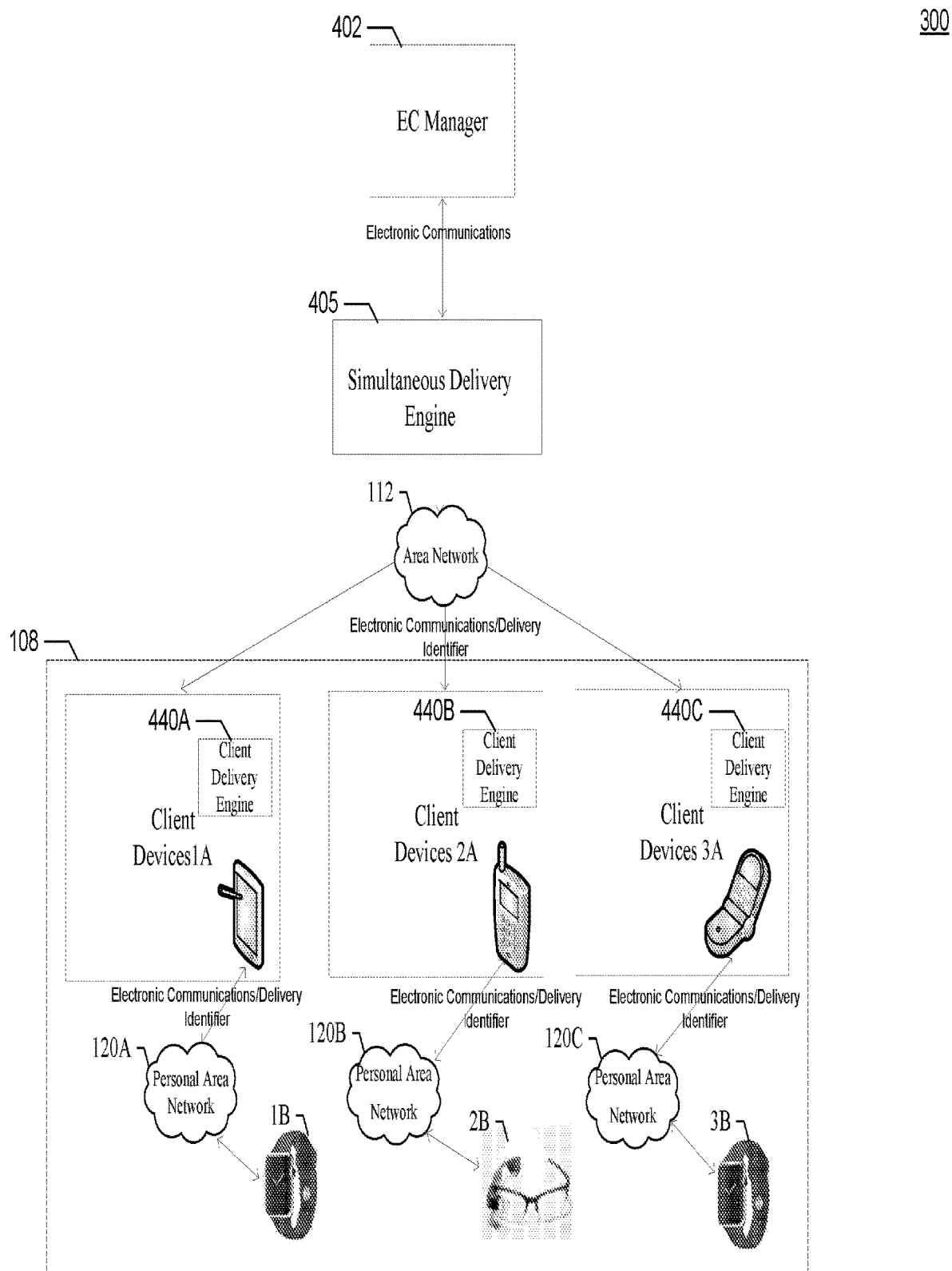
FIG. 3 illustrates an example data flow interaction between elements of an example system for implementing simultaneous delivery of output communications in accordance with some example embodiments of the present invention.

In further embodiments, the two or more client devices may be configured to determine a delivery time to simultaneously deliver, via the client delivery circuitry 226 and one or networks 112, the one or more output communications as described herein with reference to FIG. 3.

In turn, the client delivery circuitry 226 may be configured to deliver (e.g., render or display), via the input/output circuitry 222 and one or networks 112, the one or more electronic communications in the form of output communications (e.g., alerts, notifications, etc.) as described herein with reference to FIG. 3.

As will be appreciated, the apparatus 200B may be configured to execute the operations described below with respect to FIGS. 1 and 3-6. The functioning of the processor 218, the memory 220, the input/output circuitry 222, and the communication circuitry 224 may be similar to the similarly named components described above with respect to FIG. 2a. For the sake of brevity, additional description of these components is omitted.

Example Simultaneous Delivery of Output Communications Via Apparatus

FIG. 3 illustrates an example data flow interaction between a simultaneous delivery engine 405 and client devices 108. The simultaneous delivery engine 405 may be associated with EC management circuitry 210 and simultaneous delivery circuitry 212 in accordance with some example embodiments of the present invention. The simultaneous delivery engine 405 may communicate with other components of the apparatus 200A to provide electronic communications to two or more client devices 108 associated with one or more networks (e.g., networks 112, 120). In the present example, the simultaneous delivery engine 405 may manage the output of electronic communications by receiving, via the EC manager 402, one or more electronic communications. The electronic communications received by the simultaneous delivery engine 405 may be stored in memory, such as the memory 204, as described with reference to FIG. 2a.

The EC manager 402 may be associated with the EC management circuitry 210 as referenced herein with respect to FIG. 2a. The EC manager 402 may associate with other components of the apparatus 200A such as the simultaneous delivery engine 405. The EC manager 402 may receive, via the processing circuitry 202 or memory 204, the one or more electronic communications. The electronic communications received by EC manager 402, via the processing circuitry 202, may be stored in memory, such as the memory 204 as described with reference to FIG. 2a.

Further, the simultaneous delivery engine 405 may be operable to configure the one or more electronic communications for presentation to the two or more client devices based on a delivery identifier (e.g., a timestamp included in the metadata of an electronic communication. To that end, the simultaneous delivery engine 405 may configure the one or more electronic communications for provision based on one or more timing mechanisms (e.g., one or more clocks) associated with the simultaneous delivery engine 405 and each of the two or more client devices 108 (e.g., client devices 1A and 2A). In some embodiments, the simultaneous delivery engine 405 may determine a mechanism identifier (e.g., a clock time) associated with the timing mechanisms corresponding to each of the two or more client devices and the simultaneous delivery engine 405. The mechanism identifiers may begin at a base identifier (e.g., a base time of t=0:0:0). However, in alternative or additional embodiments, the mechanism identifiers may indicate a value other than zero. For example, the mechanism identifiers corresponding to the simultaneous delivery engine 405 and the two or more client devices 108 may be 11:30:10, 11:30:05, 11:30:07, respectively. To that end, the simultaneous delivery manager 405 may determine one or more offsets (e.g., a value representative of a delay in time) relative to the respective mechanism identifiers to normalize the time as between each timing mechanism corresponding to the simultaneous delivery engine 405 and each of the two or more client devices 108. In turn, the delivery identifier may be determined according to the offset. The delivery identifier may then be correlated to each of the one or more electronic communications. For example, the one or more delivery identifiers may be embedded in the metadata associated with the one or more electronic communications.

In some embodiments, the one or more electronic communications may be queued or delayed until one or more delivery identifiers associated with the one or more electronic communications corresponds to the timing mechanisms associated with each of the two or more client devices. The electronic communications, may be de-queued (e.g., removed) from the memory 204 (e.g., one or more internal buffers) based on the delivery identifier. The electronic communications may be de-queued by, for example, the first-in-first-out (FIFO), last-in-first-out (LIFO), priority, type, or other methods for removing data from a buffer based on the respective delivery identifiers.

As will be appreciated, in some embodiments, the delivery identifier (e.g., a timestamp) may include a delivery time corresponding to the time at which the one or more electronic communications may be provided, via the simultaneous delivery engine 405 and one or more networks (as described herein below), to the two or more client devices (e.g., client devices 1A and 2A). In turn, the client delivery engine (e.g., the client delivery engines 440A and 440B) may receive the one or more electronic communications. In such example embodiments, the client delivery engine 440 may be operable to configure the one or more electronic communications for presentation to the two or more client devices based on a delivery identifier. To that end, the client delivery engine 440 may configure the one or more electronic communications for simultaneous delivery based on one or more timing mechanisms (e.g., one or more clocks) associated with each of the two or more client devices 108 (e.g., client devices 1A and 2A). For example, client delivery engine 440 may determine a mechanism identifier (e.g., a clock time) associated with the timing mechanisms corresponding to each of the two or more client devices. To that end, the client delivery engine 440 may determine one or more offsets (e.g., a value representative of a delay in time) relative to the respective mechanism identifiers to normalize the time as between each timing mechanism corresponding to the each of the two or more client devices 108. In turn, the delivery identifier may be determined according to the offset. The delivery identifier may then be correlated to each of the one or more electronic communications. For example, the one or more delivery identifiers may be embedded in the metadata associated with the one or more electronic communications.

In some embodiments, electronic marketing communications may be delivered to client devices and secondary client devices using a recursive algorithm to discover delay times between client devices and secondary client devices. For example, the (primary) client device 108 may be configured to receive a request to show notifications from the simultaneous delivery engine 405. If no display time header is present in the request, the client device 108 may be configured to add a header to the message including: display-time: <current time>+<delay>=Tnotify, where <delay> is a delay time between the primary and the secondary client device. Otherwise if a header is present in the request, the header can be maintained (e.g., using a predetermined delay).

At a time T1, the client device 108 may then forward the header and messages to any sub client devices 108. Each sub client device 108 may be configured to recursively perform the steps of analyzing the header and determining delay time for sub-clients as discussed above for the primary client device 108. At a time T2, the primary client device 108 may be configured to receive confirmation from each sub client that has analyzed the timing headers and/or added predefined delay times for their sub clients. The primary client may then be configured to update the predefined delay time based on: <delay>=<factor>*(T2−T1)/2, where factor>=1. In some embodiments, the request to show notifications may further include a 'forwarded-by' header to allow tracking of the string of client devices between the source and the receiving client device (e.g.: 'forwarded-by': "source, client1A, client1B") to facilitate the recursive algorithm.

As such, the root primary client device 108 that receives the notification may be configured to determine the delay between client devices 108, and adjust the delay based on response times from all sub client devices 108. At time Tnotify, the client device 108 may be configured to show the notification.

The simultaneous delivery engine 405 may provide the one or more electronic communications for simultaneous delivery of the one or more output communications corresponding to the one or more electronic communications, via the client delivery engine 440, associated with one or more networks (e.g., networks 112, 120). As will be appreciated, the one or more networks may comprise at least one of an area network (e.g., a wide area network, local area network, or personal area network such as a network configured to support Bluetooth® compatible protocols and technologies), virtual private network, mobile network (e.g., a network provided by a mobile carrier), or communication network. For example, the simultaneous delivery engine 405 may provide one or more electronic communications, via one or more networks 112 and 120, to the two or more client devices 108.

The client device (e.g., the client device 1A) may be configured to receive the one or more electronic communications via the simultaneous delivery engine 405 and a network 112. For example, the network 112 associated with a client device (e.g., the tablet client device 1A) may comprise an area network such as a wide area network and a local area network. In some embodiments, the client device may associate with a wide area network (e.g., the Internet) via a local area network (e.g., a Wi-Fi network) by which the one or more electronic communications may be received, via one or more fiber optic cables, packet switching protocols, internet protocols, routers, relays, etc., associated with the any given network. Alternatively or additionally, the network associated with a client device (e.g., the smartphone client device 2A) may comprise a mobile network (e.g., a wide area network).

The simultaneous delivery engine may be configured to determine two or more client devices that may be configured to receive one or more electronic communications. The simultaneous delivery engine may be configured to determine two or more client devices based on various protocols configured to detect other client devices, registration data (e.g., a telephone number, an IP address associated with a client device, or any other client device identifier, parameters, setting, etc.), transceiver data (e.g., data received via one or more transceivers), etc. As will be appreciated the simultaneous delivery engine may determine two or more client devices associated with the simultaneous delivery engine prior to, in parallel, or subsequent to receiving the one or more electronic communications.

Alternatively or additionally, the simultaneous delivery engine 405 may provide the one or more electronic communications to the two or more client devices in response to the expiration of a predetermined period (e.g., a latent period or period of time between the receipt of the one or more electronic communications and the time corresponding to the delivery identifier). Yet in further embodiments, the simultaneous delivery engine 102 may determine a predetermined period to provide the one or more electronic communications in response to receiving the indication of the secondary client device associated with the client device.

In some embodiments, the two or more client devices 108 may comprise a client device (e.g., the client device 1A, 2A, or 3A such as a tablet or smartphone) and one or more secondary client devices (e.g., the client device 1B, 2B, or 3B such as a smart watch or other wearable). The client device and the secondary client devices may be configured to receive, via the client delivery engine 405 and the one or more networks 112 and 120, the one or more electronic communications.

The client device (e.g., the client device 1A) may be configured to receive the one or more electronic communications via the client delivery engine 405 and a first network 112. For example, the first network 112 associated with a client device (e.g., the smartphone client device 2A) may comprise an area network such as a wide area network (e.g., a mobile network). For example, the client device may correspond to the mobile network by which the one or more electronic communications may be received, via one or more cellular sites or base stations associated with the any given mobile network. Alternatively or additionally, the first network associated with a client device (e.g., the smartphone client device 2A) may comprise an area network such as a local area network (e.g., a network configured to support Wi-Fi technology).

In further embodiments, the client device (e.g., the smartphone client device 2A) may be configured to determine, via the client delivery engine (e.g., the client delivery engine 440B), one or more secondary client devices associated with the client device. The client device may determine one or more secondary client devices (e.g., the smart eyewear client device 2B) associated with the client device based on a discovery protocol (e.g., the Bluetooth® Service Discovery Protocol or any other protocol configured to detect other client devices), transceiver data (e.g., data received via one or more transceivers), registration data (e.g., device location data, parameters, settings, etc.), etc. As will be appreciated the client device may determine one or more secondary client devices associated with the client device prior to, in parallel, or subsequent to receiving the one or more electronic communications.

The client device may be further configured to provide, via client delivery engine, the one or more electronic communications to the secondary client device via one or more networks 112, 120. In some embodiments, the one or more networks may comprise a secondary network (e.g., a personal area network 120B). A secondary network associated with a secondary client device (e.g., the smart eyewear client device 2B) may comprise a personal area network (e.g., a network configured to support Bluetooth® technology). To that end, the secondary client device (e.g., the smart eyewear client device 2B) may be operable to associate or otherwise communicate, via the secondary network 120B (e.g., by pairing the client devices 2A and 2B via Bluetooth®), with the client device (e.g., the smartphone client device 2A). For example, the smartphone client device 2A may provide, via client delivery engine 440B, the one or more electronic communications to the secondary client device (e.g., smart eyewear client device 2B) via the personal area network 120B (e.g., a Bluetooth® network). In turn, the client delivery engine corresponding to the secondary client device (not shown) may receive the one or more electronic communications.

In response to receiving the one or more electronic communications, the client device (e.g., the tablet or smartphone) and the secondary client device (e.g., the smart watch or other wearable) may be configured to provide, via the one or more networks 112 and 120, a delivery indication corresponding to the one or more electronic communications. For example, the client device 2A may provide a delivery confirmation or other acknowledgment to the simultaneous delivery engine 405. The secondary client device 2B may provide a delivery confirmation or other acknowledgment to the client device associated with the client delivery engine 440. In some embodiments, the client device 2A and the secondary client device 2B may provide a delivery confirmation or other acknowledgment to the simultaneous delivery engine 405.

In turn, the client delivery engines corresponding to the client devices 180 may be configured determine, via the client delivery engine, the delivery time at which one or more output communications may be delivered (e.g., output). For example, the respective client delivery engines 440A, 440B associated with the client device 1A and the client device 2A may determine, via the metadata associated with the one or more electronic communications, the delivery time at which the one or more electronic communications may be output.

Alternatively or additionally, the other example client devices 180 may be configured determine, via the client delivery engine 440, the delivery time at which the one or more output communications may be output. For example, the respective client delivery engines associated with the client device 2A and the secondary client device 2B may determine, via the metadata associated with the one or more electronic communications, the delivery time at which the one or more output communications may be delivered.

In some embodiments, the one or more client devices 180 may determine, via the client delivery engine 440, a mechanism identifier (e.g., a clock time) associated with the timing mechanisms corresponding to each of the two or more client devices (e.g., the smartphone client device 2A and the smart eyewear secondary client device 2B). The client devices 180 may determine one or more offsets (e.g., a value representative of a delay in time) relative to the respective mechanism identifiers to normalize the time as between each timing mechanism corresponding to each of the two or more client devices 108. In turn, the delivery time may be determined based on the offset.

Figure 4:
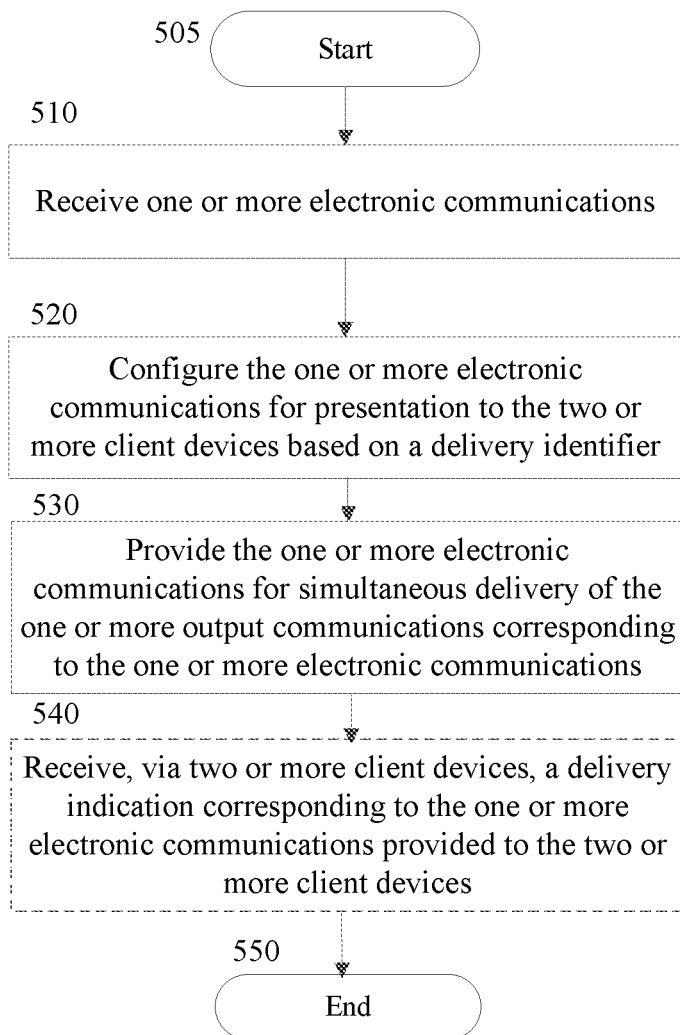
FIG. 4 illustrates a flowchart describing an exemplary process for providing simultaneous delivery of output communications in accordance with some example embodiments discussed herein.

In further embodiments, each of the client devices 180 (e.g., the client devices 2A and 2B or the client devices 1A and 2A) may simultaneously deliver, via the client delivery engine 440, one or more output communications based at least in part on the delivery time. As will be appreciated by one of ordinary skill in the art, delivering, via the input/output circuitry 206, the one or more output communications may include generating, via the client delivery engine, one or more one or more output communications. For example, the client delivery engine 440 may receive and/or access the one or more electronic communications. In turn, the client delivery engine 440 associated with each of the two or more client devices may configure the one or more electronic communications to correspond to one or more output communications (e.g., the one or more electronic communications may be configured for display, via the two more user interfaces associated with a client device 108, as one or more output communications). In such example embodiments, the one or more output communications may take the form of an email message. The email message may then be delivered (e.g., displayed via the user interface) via the input/output circuitry corresponding to the two more client devices at the delivery time. In some embodiments, the one or more output communications may take the form of an audible sound (e.g., outputting a ringtone, message tone, or other sound via the client device 180), a device movement (e.g., causing the device to vibrate, shake, oscillate, move, or otherwise indicate a state of motion or oscillation), etc. FIGS. 4-5 further describe example embodiments of operations and processes for providing simultaneous delivery of output communications.

Example Process for Providing Simultaneous Delivery of Output Communications

Turning now to FIG. 4, example operations for providing simultaneous delivery of output communications are illustrated from the perspective of a server that incorporates a simultaneous delivery engine. Providing a platform to deliver simultaneous output communications via two or more client devices eliminates the breaks in electronic communications that occur when one output communication is delivered at different points in time via each of the two or more client devices. The operations illustrated in FIG. 4 may, for example, be performed by elements of the simultaneous delivery engine 102 (e.g., the server 104) described with respect to FIG. 1, with the assistance of, and/or under the control of one or more devices, such as apparatus 200A and/or 200B. In particular, embodiments of a process 400 may be performed by simultaneous delivery circuitry 212 and EC management circuitry 212 as described above with respect to FIG. 2a. Such circuitry may provide means for performing the various actions described with respect to the process 400.

Flow diagram 400 may begin at action 505 and proceed to action 510, where the server 104 may be configured to receive one or more electronic communications. For example, server 104 may receive electronic communications provided, via EC management circuitry 212, in response to a receipt of the electronic communications by the EC management circuitry 212.

As shown in block 520 of FIG. 4, the system 102, may include means, such as the simultaneous delivery engine 102 for configuring the one or more electronic communications for receipt via the two or more client devices based on a delivery identifier. To that end, the simultaneous delivery circuitry 212 may be configured to embed the one or more electronic communications with one or more delivery identifiers. For example, the simultaneous delivery circuitry 212 may embed one or more timestamps in the data associated with the electronic communications. The timestamps allow for delivery of the electronic communications to two or more client devices. In some embodiments, the timestamps may include a delivery time at which one or more output communications corresponding to the electronic communications may be delivered by the two or more client devices as described herein with reference to FIG. 3. For example, the two or more devices configured to receive the electronic communications may not deliver (e.g., vibrate, or otherwise output a sound) the one or more output communications until the indicated time based on the delivery identifier; thereby, delaying the output of the output communications. Though unconventional, this delay in providing the electronic communications and/or subsequently outputting the one or more output communications allows the timing mechanisms associated with each client device to sync as described with reference to FIG. 3. In some embodiments, client device 108 and secondary client devices 108 maintain a heartbeat between them. As such, the primary client device 108 may be configured to specify the notification time expressed in an offset in heartbeats for secondary client devices 108.

As shown in block 530 of FIG. 4, simultaneous delivery engine 102, may include means for providing the one or more electronic communications to the two or more client devices, via the client delivery engine 440, for simultaneous delivery of corresponding output communications by the two or more client devices. The one or more electronic communications may be provided based on the delivery identifier (e.g., a timestamp). In some embodiments, the delivery identifier may include a delivery time at which the electronic communications may be provided to the two or more client devices. In other example embodiments, the delivery identifier may include a delivery time at which the output communications may be delivered, via the client delivery engine, by the two or more client devices.

Flow diagram 400 may proceed to action 540, where the simultaneous delivery engine 102 may be configured to receive, via the client delivery engine associated with two or more client devices, a delivery indication corresponding to the one or more electronic communications provided to the two or more client devices. Upon the two or more client devices receiving the one or more electronic communications, the two or more client devices may provide a delivery indication (e.g., a receipt confirmation) corresponding to the one or more electronic communications. In turn, the two or more client devices may be configured to determine a delivery time corresponding to the one or more electronic communications as described herein with reference to FIG. 3.

Figure 5:
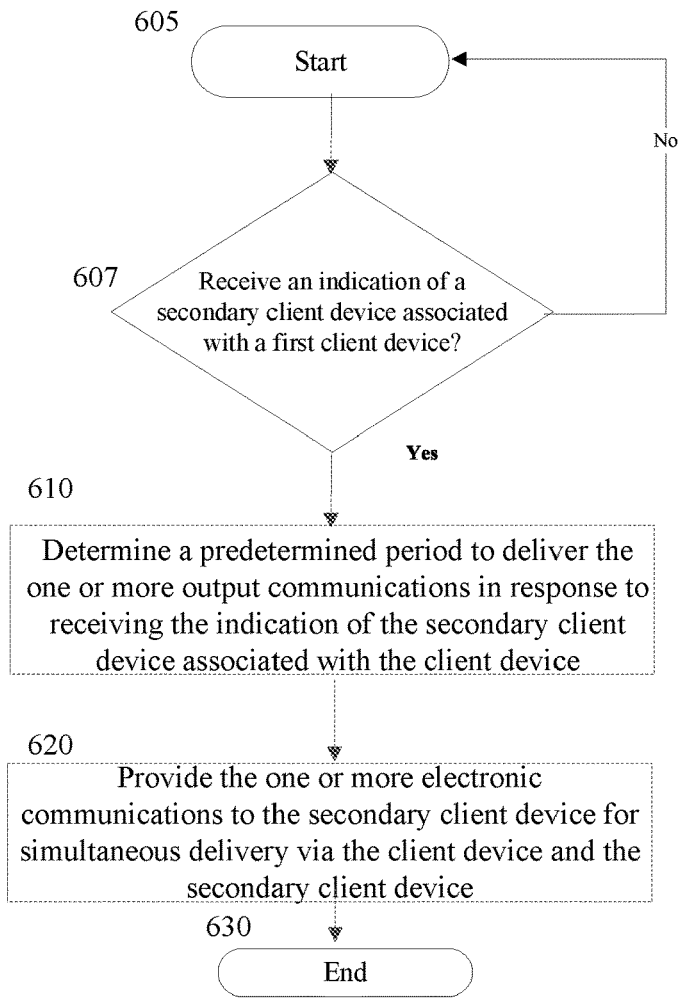
FIG. 5 illustrates a flowchart showing an exemplary process for providing simultaneous delivery of output communications among a client device and secondary client device in accordance with some example embodiments discussed herein.

Example Process for Providing Simultaneous Delivery of Output Communications via a Client Device Associated With a Secondary Client Device FIG. 5 illustrates example operations for providing simultaneous delivery of output communications via a client device associated with a secondary client device from the perspective of a client device that incorporates a client delivery engine (e.g., the client delivery engine 440). Providing a platform to deliver simultaneous delivery of output communications via a client device associated with a secondary client device eliminates the inconsistency in delivery of the output communications corresponding to electronic communications that occur when a client device is associated with a network other than the network associated with the secondary client device. The operations illustrated in FIG. 5 may, for example, be performed by elements of the client delivery engine 440 described with respect to FIG. 3, with the assistance of, and/or under the control of one or more devices, such as apparatus 200A and/or 200B. In particular, embodiments of a process 500 may be performed by client delivery circuitry 226 as described above with respect to FIGS. 2a and 2b. Such circuitry may provide means for performing the various actions described with respect to the process 500.

Flow diagram 500 may begin at action 605 and proceed to action 607, where the simultaneous delivery engine 102 may be configured to determine, via the processing circuitry 202, whether a client device is associated with a secondary client device. To that end, the server 104 may receive an indication of a secondary client device associated with a first client device of the two or more client devices. In some embodiments, the client delivery engine 440 may monitor for one or more client devices (e.g., secondary client devices) that may be associated with the client device to determine whether a client device is associated with a secondary client device. In some exemplary embodiments, the client delivery engine 440 may determine a client device is associated with a secondary client device in response to receiving an indication of a secondary client device associated with a first client device and, thereby, proceed to action 610. For example, the client device may receive an indication of a secondary client device based on an indication received via a discovery protocol (e.g., the Bluetooth® Service Discovery Protocol), transceiver data (e.g., data received via one or more transceivers), registration data (e.g., device location data, parameters, settings, etc.).

If the client delivery engine 440 determines that the client device is not associated with a secondary client device, the flow diagram 500 may proceed to action 605 where the client delivery engine 440 may resume monitoring for receipt of an indication of a secondary client device associated with a client device of the two or more client devices.

At action 610, the client delivery engine 440 may be configured to determine a predetermined period to deliver the one or more output communications in response to receiving the indication of a secondary client device associated with the client device. For example, the client delivery engine 440 may determine the predetermined period based on the communication latency and the desired user experience. The predetermined period may be in a range smaller than the delay acceptable for a user to cognitively perceive (e.g., notice) a delay in output of the output communications. For example, for one or more output communications (e.g., a SMS message, or email notification) corresponding to one or more electronic communications (e.g., electronic data corresponding to an incoming message), the predetermined time period may be two seconds. To that end, a user may cognitively perceive the output communication (e.g., a text message or email notification corresponding to an incoming message) delivered, via a client device, is delayed when the delivery of an output communication (e.g., a text message or email notification corresponding to a secondary client device) is delayed two seconds. In other example embodiments, for one or more output communications (e.g., an audible sound, or ring) corresponding to one or more electronic communications (e.g., electronic data corresponding to an incoming call), the predetermined time period may be a second. In other words, a user may cognitively perceive the output of a ring, via a client device, is delayed when the output of a ring, via a secondary client device, is delayed one second.

Flow diagram 500 may proceed to action 620, where the client delivery engine 440 may be configured to deliver the one or more output communications via the two or more client devices as described herein with reference to FIG. 3. As discussed above, the client delivery engine 440 may be configured to deliver the one or more output communications to a secondary client device via a network 120 that is separate from the network 112 (e.g., between the client delivery engine 440 and the simultaneous delivery engine 405). The network 120 may include a personal area network, for example, which can be activated without requiring the secondary client device having an active connection to the network 112 (e.g., the Internet). Advantageously, the communication interfaces and other networking hardware on the secondary client device can be reduced, resulting in lighter devices, more flexible form factors, cheaper components, etc. while preserving robust and coordinated communication functionality with the remote simultaneous delivery engine 405 (e.g., even when the secondary client device is offline).

Example Electronic Communication Data Flow

Figure 6:
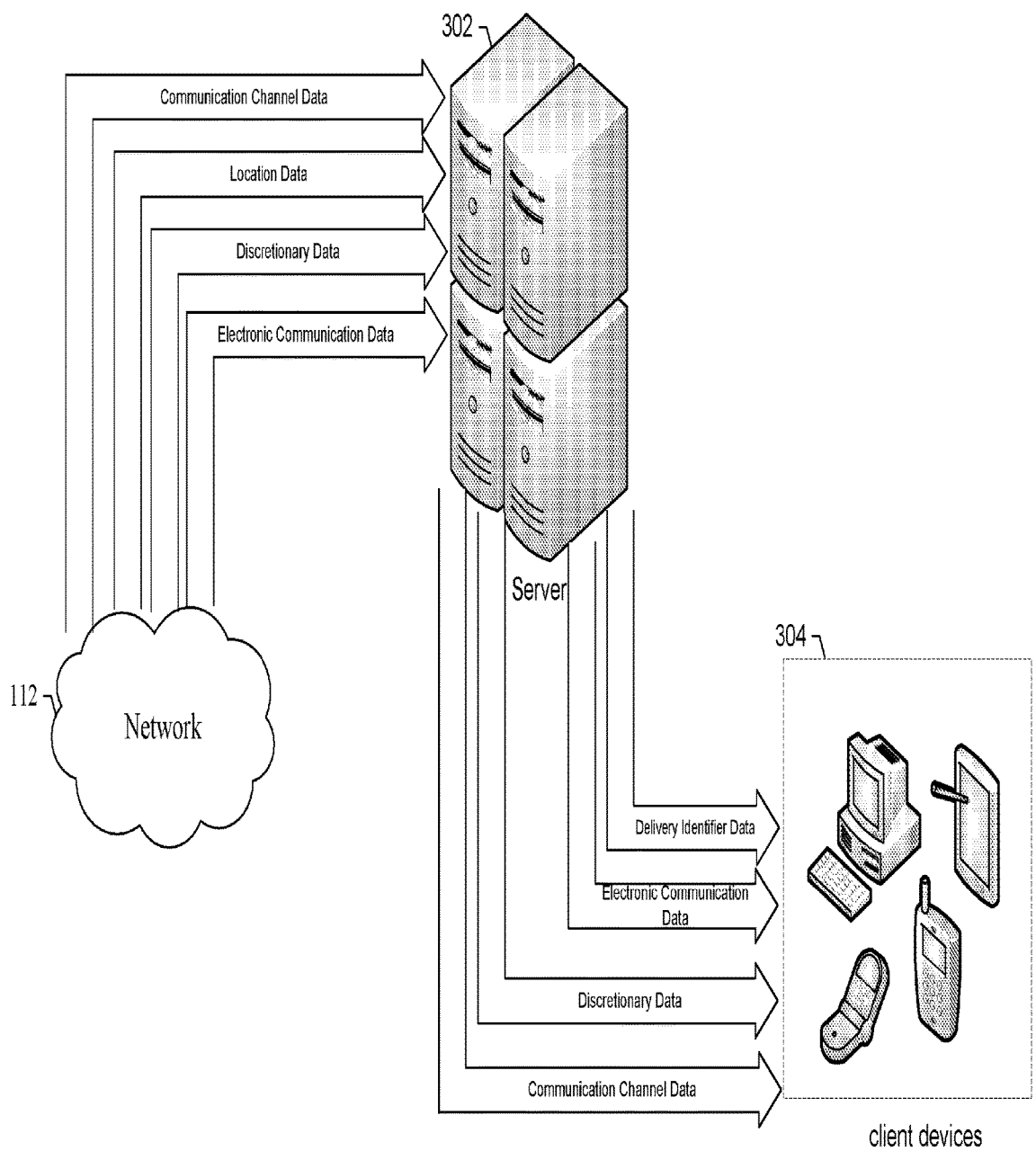
FIG. 6 illustrates an example data flow among a client device and a server in accordance with some example embodiments of the present invention.

FIG. 6 depicts an example data flow 600 illustrating interactions between a server 302 and one or more client devices 304. The server 302 may be implemented in the same or a similar fashion as the server 104 as described above with respect to FIG. 1 and the one or more client devices 304 may be implemented in the same or a similar fashion as the client devices 108A-N as described above with respect to FIG. 1.

The data flow 600 illustrates how electronic information may be passed among various systems when employing a server 302 in accordance with embodiments of the present invention. The one or more client devices 304 may provide a variety of electronic communications to the server 302 for use in providing simultaneous delivery of output communications to the user associated with one or more client devices 304. These electronic communications may include, but is not limited to electronic communication data, location data, communication channel data, and/or discretionary data.

It should also be appreciated that the server 302 may determine the form, structure, frequency, and type of the electronic communications which may be delivered simultaneously. As with the content of the electronic communications, these factors may be programmatically determined according to various methods, factors, and processes based on electronic data received by the server 302 for the purpose of maximizing the likelihood that the communication will be simultaneously delivered, via the client device, and, thereby, provided to the user.

Embodiments advantageously provide for improvements to the server 104 by providing simultaneous delivery of output communications to two or more client devices 108. Such simultaneous delivery provides improved techniques for outputting one or more output communications simultaneously as described herein. In particular, embodiments provide improved techniques for receiving electronic communications and providing corresponding output communications to two or more client devices via one or more networks.

Furthermore, improvements to the server 104 include providing the ability to simultaneous deliver output communications among a client device and secondary client device. Such embodiments improve the operations and methods for simultaneously receiving, providing, and delivering the output communications to the client device and the secondary client device via one or more networks. In particular, embodiments again provide improved techniques for evaluating electronic communication data, location data, communication channel data, and/or discretionary data.

As such, improvements described herein serve to deliver output communications simultaneously as provided by the server 104 by providing a platform to configure the electronic communications for provision to a client device based on a delivery identifier, sync or normalize timing mechanisms associated with each client device, and provide the electronic communications to the client devices 108 though the client devices 108 may be associated with the same or different network.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein. Accordingly, blocks of the block diagrams and flowchart illustrations support combinations of means for performing the specified functions, combinations of steps for performing the specified functions and program instruction means for performing the specified functions. With regard to such flowchart illustrations, while various embodiments are described as sequential steps for illustrative purposes, the inventive concepts described herein are not necessarily limited to the sequences illustrated. Indeed, various steps may be performed before or after the other as may be apparent to one of ordinary skill in the art in view of the disclosure. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the That which is claimed:

1. An apparatus configured to facilitate delivery of output communications, the apparatus comprising:
a processor including one or more processing devices configured to perform independently or in tandem to execute hard-coded functions or execute software instructions; and
a non-transitory memory comprising one or more volatile or non-volatile electronic storage devices storing computer-readable instructions, the computer-readable instructions being configured, when executed, to cause the processor to:
receive one or more electronic communications corresponding with the output communications;
determine one or more secondary client devices associated with a primary client device, wherein the primary client device is in communication with the apparatus via a first communications network, and wherein the one or more secondary client devices are in communication with the primary client device via a second communications network separate from the first communications network;
determine, based at least in part on a recursive algorithm, one or more offsets between the primary client device and the one or more secondary client devices;
determine, based at least in part on the one or more offsets, a mechanism identifier associated with each of the primary and secondary client devices;
correlate one or more delivery identifiers to the one or more electronic communications based at least in part on the mechanism identifiers;
embed the one or more delivery identifiers in the one or more electronic communications; and
provide the one or more electronic communications to the primary client device and the one or more secondary client devices to cause simultaneous delivery of the corresponding output communications based at least in part on the one or more delivery identifiers.

2. The apparatus according to claim 1, wherein the computer-readable instructions are further configured, when executed, to cause the processor to determine the one or more secondary client devices based at least in part on a discovery protocol.

3. The apparatus according to claim 1, wherein the computer-readable instructions are further configured, when executed, to determine a predetermined period to deliver the corresponding output communications based at least in part on user client device settings.

4. The apparatus according to claim 1, wherein the first communications network comprises a wide area network, and wherein the second communications network comprises a personal area network.

5. The apparatus according to claim 1, wherein the computer-readable instructions are further configured, when executed, to cause the processor to embed the one or more delivery identifiers in metadata associated with the one or more electronic communications.

6. A machine implemented method for facilitating delivery of output communications, the method comprising:
receiving, by processing circuitry of an apparatus, one or more electronic communications corresponding with the output communications;
determining, by the processing circuitry, one or more secondary client devices associated with a primary client device, wherein the primary client device is in communication with the apparatus via a first communications network, and wherein the one or more secondary client devices are in communication with the primary client device via a second communications network separate from the first communications network;
determining, by the processing circuitry and based at least in part on a recursive algorithm, one or more offsets between the primary client device and the one or more secondary client devices;
determining, by the processing circuitry and based at least in part on the one or more offsets, a mechanism identifier associated with each of the primary and secondary client devices;
correlating, by the processing circuitry, one or more delivery identifiers to the one or more electronic communications based at least in part on the mechanism identifiers;
embedding, by the processing circuitry, the one or more delivery identifiers in the one or more electronic communications; and
providing, by the processing circuitry, the one or more electronic communications to the primary client device and the one or more secondary client devices to cause simultaneous delivery of the corresponding output communications based at least in part on the one or more delivery identifiers.

7. The machine implemented method according to claim 6, further comprising determining, by the processing circuitry, the one or more secondary client devices based at least in part on a discovery protocol.

8. The machine implemented method according to claim 6, further comprising determining, by the processing circuitry, a predetermined period to deliver the corresponding output communications based at least in part on user client device settings.

9. The machine implemented method according to claim 6, wherein the first communications network comprises a wide area network, and wherein the second communications network comprises a personal area network.

10. The machine implemented method according to claim 6, further comprising embedding, by the processing circuitry, the one or more delivery identifiers in metadata associated with the one or more electronic communications.

11. A computer program product configured to facilitate delivery of output communications, the computer program product comprising at least one non-transitory computer-readable storage medium having computer executable program code instructions therein, the computer executable program code instructions comprising program code instructions configured, upon execution to:
receive one or more electronic communications corresponding with the output communications;
determine one or more secondary client devices associated with a primary client device, wherein the primary client device is in communication with an apparatus via a first communications network, and wherein the one or more secondary client devices are in communication with the primary client device via a second communications network separate from the first communications network;

determine, based at least in part on a recursive algorithm, one or more offsets between the primary client device and the one or more secondary client devices;

determine, based at least in part on the one or more offsets, a mechanism identifier associated with each of the primary and secondary client devices;

correlate one or more delivery identifiers to the one or more electronic communications based at least in part on the mechanism identifiers;

embed the one or more delivery identifiers in the one or more electronic communications; and provide the one or more electronic communications to the primary client device and the one or more secondary client devices to cause simultaneous delivery of the corresponding output communications based at least in part on the one or more delivery identifiers.

12. The computer program product according to claim 11, wherein the computer executable program code instructions further comprise program code instructions configured, upon execution, to:

determine the one or more secondary client devices based at least in part on a discovery protocol.

13. The computer program product according to claim 11, wherein the computer executable program code instructions further comprise program code instructions configured, upon execution, to:

determine a predetermined period to deliver the corresponding output communications based at least in part on user client device settings.

14. The computer program product according to claim 11, wherein the first communications network comprises a wide area network, and wherein the second communications network comprises a personal area network.

* * * * *